United States Patent [19]

Maruyama et al.

[11] Patent Number: 5,463,663
[45] Date of Patent: Oct. 31, 1995

[54] CONTROLLING SYNCHRONIZATION IN A SYSTEM HAVING A PLURALITY OF UNITS WHEN A UNIT IS DISCONNECTED FROM OR CONNECTED TO THE SYSTEM THAT IS ACTIVE

[75] Inventors: Takumi Maruyama; Takashi Onodera; Nobuko Hatakenaka, all of Kawasaki; Hiroaki Uno, Osaka; Noriyuki Yokoshi, Kawasaki, all of Japan

[73] Assignee: Fujitsu Limited, Kanagawa, Japan

[21] Appl. No.: 189,056

[22] Filed: Jan. 31, 1994

[30] Foreign Application Priority Data

Sep. 20, 1993 [JP] Japan .................................. 5-256381

[51] Int. Cl.$^6$ .................................................... H04L 7/00
[52] U.S. Cl. ..................................... 375/356; 340/825.2
[58] Field of Search ............................. 375/356, 357, 375/358; 455/51.1; 395/550; 340/825.14, 825.2

[56] References Cited

U.S. PATENT DOCUMENTS

| 3,876,983 | 4/1975 | Zafiropulo et al. | 375/107 |
| 4,417,242 | 11/1983 | Bapst et al. | 375/107 |

FOREIGN PATENT DOCUMENTS 63-188287 8/1988 Japan .
2-297616 12/1990 Japan .
4-58480 2/1992 Japan .

*Primary Examiner*—Stephen Chin
*Assistant Examiner*—Hai H. Phan

[57] ABSTRACT

An apparatus for controlling synchronization in a system having at least first and second units each having internal circuits includes signal paths through which a control signal output from a second unit is sent to a first unit and a control signal output from the first unit is sent to the second unit. A first preparatory process part carries out a process to place the internal circuits of the second unit in an operating state when the second unit is connected to the system and for outputting a control signal to the signal paths. A first function mask control part is provided for stopping the operation of the internal circuits of the second unit when a control signal from the first unit is not received by the second unit, and for restarting the operation of the internal circuits when the control signal is received. A second preparatory process part carries out a process to place the internal circuits of the first unit in an operating state when the control signal from the second unit is received by the first unit, and for outputting a control signal to the signal paths. A second function mask control part is provided for stopping the operation of the internal circuits of the first unit when the control signal is not received, and for re-starting the operation of the internal circuits when the control signal is received.

8 Claims, 7 Drawing Sheets

CONTROLLING SYNCHRONIZATION IN A SYSTEM HAVING A PLURALITY OF UNITS WHEN A UNIT IS DISCONNECTED FROM OR CONNECTED TO THE SYSTEM THAT IS ACTIVE

BACKGROUND OF THE INVENTION (1) Field of the Invention

The present invention relates to an apparatus and method for controlling synchronization in a system having a plurality of units when one of the units is disconnected from or connected to the system that is active.

(2) Description of the Prior Art

Generally, a system is comprised of a plurality of functional components, such as functional blocks, packages or printed circuit boards, and a plurality of functions of the system are respectively assigned to the functional components. Several systems are provided with a synchronization control capability that enables the operation of each of the units to be started and stopped in synchronism with each other if one unit is extracted from or inserted in the system that is active or powered ON. It is necessary that none of the functions of the system be considerably affected by the extraction of the unit or the insertion thereof when the system is active.

In the system of the type having a plurality of units to carry out a plurality of functions, each of the functions is accomplished by one unit independently of the other units. When one of the units is disconnected from or connected to the system that is active, it is necessary that the other units are reported of the connection or disconnection of the unit at the same time as the occurrence of the connection or disconnection. In addition, it is necessary to perform a resetting process for the unit or a function masking process for the other units at the time of the notification, in order not to considerably affect any of the other functions of the system.

Known synchronization control methods of the type described above are proposed in Japanese Laid-Open Patent Applications No.63-188287, No.2-297616 and No.4-58480.

In the proposed methods disclosed in the above-mentioned publications, a plurality of units are installed on a back wiring board (BWB) of the system by using multiple-pin connectors between the units and the BWB. In order to electrically connect the installed units to a system bus of the BWB, each unit is provided with a multiple-pin connector having long pins arranged in the connector center and short pins arranged at the connector end portions. In a case in which one of the units is extracted from the BWB, the disconnection of the unit (the stopped state) is reported to the other units of the system by turning OFF a signal path of a control signal sent to the other units when at least one of the short pins of the connector is not in contact with the BWB.

On the other hand, if the extracted unit is inserted in the BWB again, the connection of the unit (the operating state or the active state) is notified to the other units of the system by turning ON the signal path of the control signal when both the short pins of the connector come into contact with the BWB. In this manner, the conventional methods make it possible to extract one unit from the system or insert it without considerably affecting any of the other functions of the system.

However, one of the plurality of functions of the system is not necessarily assigned to a single component, and the system may carry out one function using a plurality of components in combination. Hereinafter, the plurality of components that carry out one of the functions with the units in combination are referred to as a combination of units.

For example, in a communication control system, one of several functions can be accomplished with a combination of a main processor unit and a main memory unit, and another function can be carried out with a combination of a main controller unit and a sub-controller unit. If one of such a combination of units is connected to the system but the other unit is disconnected or out of order, the system cannot suitably carry out the function which is assigned to the combination of units.

Therefore, if only one of the combination of units is connected to the system and the other unit is not connected thereto, the operating state of the unit and the stopped state of the other unit must be notified. If such a notification is not made, the system may operate incorrectly. For this reason, in a system having a plurality of units to carry out a prescribed function (one of several functions), it is necessary to carry out a synchronization control for the system which handles the notification of the operating state or stopped state of each unit to the corresponding unit. However, when the system has a large number of units to carry out the prescribed function or when several units are added or omitted, the hardware or the software needed to realize the above synchronization control will become complicated.

SUMMARY OF THE INVENTION

Accordingly, it is a general object of the present invention to provide an improved synchronization control apparatus and method in which the above described problems are eliminated.

Another, more specific object of the present invention is to provide an apparatus and method for controlling synchronization in a system having a plurality of units to carry out a prescribed function, which enables the operation of each of the units to be started or stopped in synchronism with each other when one of the units is extracted from or inserted in the system that is active.

The above mentioned objects of the present invention are achieved by a synchronization control apparatus for controlling synchronization in a system having a plurality of units when one of the units is disconnected from or connected to the system that is active. In this synchronization control apparatus, a prescribed function is carried out by a combination of the units including a first unit and a second unit, and both the units have a set of internal circuits to carry out the prescribed function and are removably installed on a unit installing part. The apparatus includes: signal paths through which a control signal output from the second unit is sent to the first unit and a control signal output from the first unit is sent to the second unit; a first preparatory process part for carrying out a preparatory process to place the internal circuits of the second unit in an operating state when the second unit is connected to the system, and for outputting a control signal to the signal paths at the end of the preparatory process; a first function mask control part for stopping the operation of the internal circuits of the second unit when a control signal output from the first unit is not received, and for re-starting the operation of the internal circuits of the second unit when the control signal from the first unit is received; a second preparatory process part for carrying out a preparatory process to place the internal circuits of the first unit in an operating state when the control signal from the second unit is received, and for outputting a control signal to the signal paths at the end of the preparatory process; and a second function mask control part for stopping the operation of the internal circuits of the first unit when the control signal from the second unit is not received, and for re-starting the operation of the internal circuits of the first unit when the control signal from the second unit is received.

The above mentioned objects of the present invention are also achieved by a method of controlling synchronization in a system having a plurality of units when one of the units is disconnected from or connected to the system that is active, wherein a prescribed function is carried out by a combination of the units including a first unit and a second unit, and both the first unit and the second unit have a set of internal circuits to carry out the prescribed function and are removably installed on a unit installing part. This method comprises the steps of:

placing the internal circuits of the second unit in an operating state when the second unit is connected to the system;

outputting a control signal from the second unit to signal paths of the unit installing part at the end of the placing step for the second unit;

stopping the operation of the internal circuits of the second unit when a control signal output from the first unit is not received, and restarting the operation of the internal circuits of the second unit when the control signal from the first unit is received;

placing the internal circuits of the first unit in an operating state when a control signal output from the second unit is received;

outputting a control signal from the first unit to the signal paths at the end of the placing step for the first unit; and stopping the operation of the internal circuits of the first unit when the control signal from the second unit is not received, and re-starting the operation of the internal circuits of the first unit when the control signal from the second unit is received.

According to the present invention, it is possible for the system to start or stop the operations of the units of the combination in a synchronous manner with each other when one unit of the combination is connected to or disconnected from the system that is active. It is possible that each of the units detects the insertion or the extraction of a cooperating unit of the combination in accordance with the reception of a control signal, and that, in accordance with the condition of the cooperating unit, the unit determines whether or not the control signal is sent to the cooperating unit and determines whether or not the internal circuits of the unit are set to the operating state.

BRIEF DESCRIPTION OF THE DRAWINGS

The above and other objects, features and advantages of the present invention will be more apparent from the following detailed description when read in conjunction with the accompanying drawings in which.

DESCRIPTION OF THE PREFERRED EMBODIMENT

Figure 1:
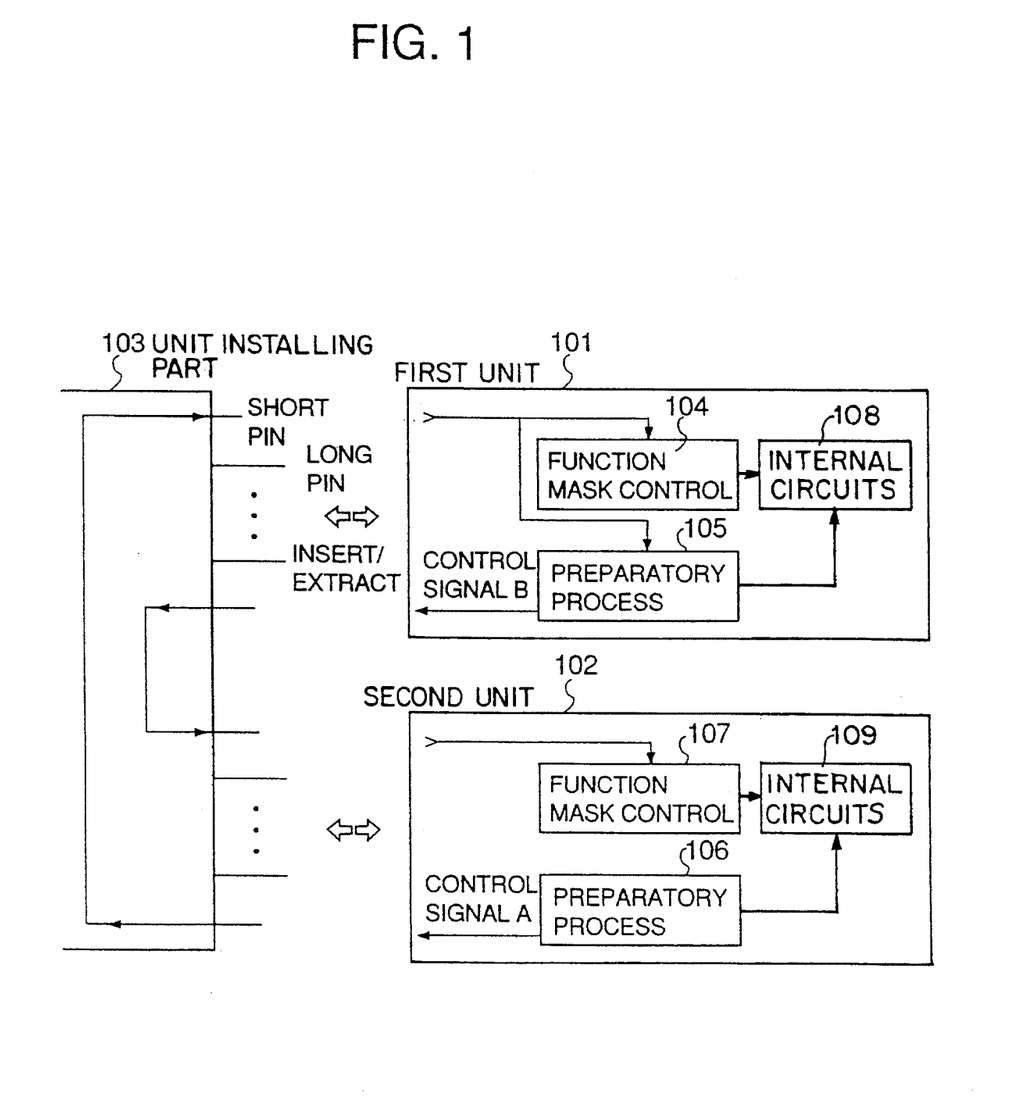
FIG.1 is a diagram for explaining a synchronization control apparatus according to the present invention.

A description will now be given, with reference to FIG.1, of a synchronization control apparatus according to the present invention. In FIG.1, a system is comprised of a first unit 101 and a second unit 102 which carry out a prescribed function by a combination of the units, and a unit installing part 103 in which the units 101 and 102 are installed or disconnected. The synchronization control apparatus of the present invention carries out synchronization control for this system when one of the units 101 and 102 is extracted from or inserted in the system that is active.

The synchronization control apparatus in FIG.1 includes signal paths, provided within the unit installing part 103, through which a first control signal A output from the second unit 102 is sent to the first unit 101 and a second control signal B output from the first unit 101 is sent to the second unit 102.

The second unit 102, which is one of the combination of units in the system, includes a preparatory process part 106 for carrying out a preparatory process to place internal circuits 109 of the second unit 102 in an operating state when the second unit 102 is connected to the system, and for outputting a control signal to the signal paths at the end of the preparatory process. The second unit 102 includes a function mask control part 107 for stopping the operation of the internal circuits of the second unit 102 when the second control signal B from the first unit 101 is not received through the signal paths, and for re-starting the operation of the internal circuits of the second unit 102 when the second control signal B is received through the signal paths.

The first unit 101, which is the other of the combination of units in the system, includes a preparatory process part 105 for carrying out a preparatory process to place internal circuits 108 of the first unit 101 in an operating state when the first control signal A from the second unit 102 is received through the signal paths, and for outputting a control signal to the signal paths at the end of the preparatory process. The first unit 101 includes a function mask control part 104 for stopping the operation of the internal circuits 108 of the first unit 101 when the first control signal A from the second unit 102 is not received through the signal paths, and for re-starting the operation of the internal circuits 108 of the first unit 101 when the first control signal A is received through the signal paths.

Figure 2:
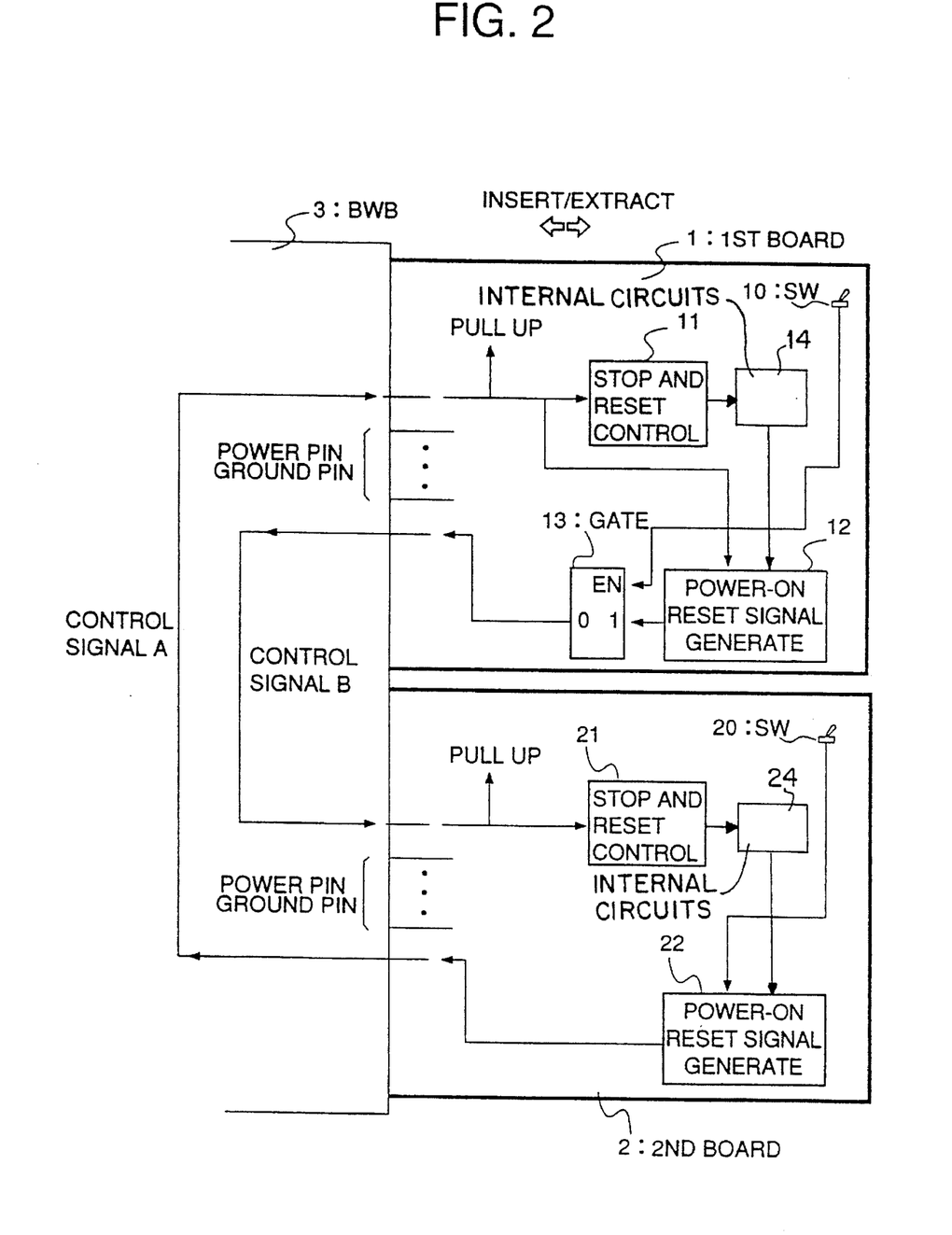
FIG.2 is a diagram showing a preferred embodiment of a synchronization control apparatus according to the present invention.

Next, a description will be given with reference to FIG.2 of a preferred embodiment of the present invention. FIG.2 shows a synchronization control apparatus to which the present invention is applied. This apparatus has a first board 1 and a second board 2. A number of internal circuits 14 and 24, respectively are installed in both the first and second boards 1 and, 2, and one of, a plurality of functions of the system is accomplished with internal circuits 14, 24 of the two boards 1 and 2 in combination. The first and second boards 1 and 2 are removably connected with a back wiring board (BWB) 3 of the system, and the two boards 1 and 2 are connected to or inserted in the system through the BWB 3.

The BWB 3 includes signal paths through which signals between the first board 1 and the second board 2 are conveyed. A control signal A from the second board 2 is sent to the first board 1 through a signal path of the BWB 3, and a control signal B from the first board 1 is sent to the second board 2 through another signal path of the BWB 3.

The first board 1 includes a switch 10, a stop and reset control part 11, a power-on reset signal generating part 12, and a gate circuit 13 in order to carry out synchronization control for the internal circuits 14, 24 of the first and second boards of the system. The second board 2 includes a switch 20, a stop and reset control part 21, and a power-on reset signal generating part 22 in order to carry out synchronization control for the internal circuits of the first and second boards of the system.

In the embodiment shown in FIG.2, the switch 10 is turned ON when the first board 1 is inserted in or connected to the BWB 3, and it is turned OFF when the first board 1 is extracted from or disconnected from the BWB 3. The primary purpose of this switch is to switch ON/OFF a bus interface circuit of the first board 1 when the board 1 is connected to or disconnected from the BWB 3 of the system. In the embodiment in FIG.2, an ON signal output from the switch 10 is used to turn the gate circuit 13 ON/OFF.

The switch 20 of the second board 2 is the same as the switch 10 described above. The switch 20 is turned ON when the second board 2 is connected to the BWB 3, and it is turned OFF when the second board 2 is disconnected from the BWB 3. In the embodiment in FIG.2, an ON signal output from the switch 20 is used to start operation of the power-on reset signal generating part 22.

The stop and reset control part 11 of the first board 1 sets the internal circuits 14 of the first board 1 to the stopped condition in response to an ON signal output from the switch 10 when the first board 1 is inserted in the BWB 3 of the system. The stop and reset control part 11 resets the internal circuits 14 of the first board 1 to the operating condition when it receives the control signal A from the second board 2. The stop and reset control part 11 of this embodiment may be a resetting circuit of a large scaled integration (LSI) microprocessor, or a halting circuit of a central processing unit (CPU).

The stop and reset control part 21 of the second board 2 is a circuit having functions that are the same as those of the part 11 described above. The stop and reset control part 21 sets the internal circuits 24 of the second board 2 to the stopped condition in response to an ON signal output from the switch 20. The stop and reset control part 21 resets the internal circuits 24 of the second board 2 to an operating condition when it receives the control signal B from the first board 1.

The power-on reset signal generating part 12 carries out the initial, power-on resetting of the internal circuits 14 of the first board 1 when power is supplied to the first board 1. When the control signal A from second board 2 via the BWB 3 is received by the part 12, the power-on reset signal generating part 12 starts the power-on reset action for the internal circuits of the first board 1 by generating a power-on reset signal to be supplied to each of the circuits. When a prescribed time period has elapsed after the start of the power-on reset action mentioned above, the power-on reset signal generating part 12 outputs a low-level reset end signal PW to the gate circuit 13. The first board 1 of this embodiment cannot start operation unless the power-on reset action mentioned above is finished by the part 12.

The power-on reset signal generating part 22 of the second board 2 is a circuit having functions which are the same as those of the part 12 mentioned above. When an ON signal output from the switch 20 at the time of the connection of the board 2 to the BWB 3 of the system (instead of the control signal A in the case of the part 12) is received by the part 22, the power-on reset signal generating part 22 starts the power-on reset action for the internal circuits of the second board 2 by generating a power-on reset signal to be supplied to each of the circuits. When a prescribed time period has elapsed after the start of the power-on reset action mentioned above, the power-on reset signal generating part 22 outputs a reset end signal, and this signal is sent from the second board 2 to the first board 1 via the BWB 3 as the control signal A.

The gate circuit 13 of the first board 1 is placed in an enable state or turned ON by an ON signal output from the switch 10 when the first board 1 is connected to the BWB 3 of the system. When the gate circuit 13 is turned ON, the reset end signal output from the power-on reset signal generating part 12 is supplied to the BWB 3 via the gate circuit 13, and this signal is sent to the second board 2 via the signal path of the BWB 3 as the control signal B.

In the first board 1, a signal path through which the control signal A output from the BWB 3 is sent to the part 11 is pulled up by a pull-up circuit to a high level "H" (=+5 V). In the second board 2, a signal path through which the control signal B output from the BWB 3 is sent to the part 21 is pulled up by a pull-up circuit at the high level "H". The control signals A and B are input to the stop and reset control part 11 and the stop and reset control part 21 when the signal path of the control signal A in the first board 1 or the signal path of the control signal B in the second board 2 is changed to a low "L" level. If the control signal A is not input to the first board 1, the signal path of the control signal A is set to the H level by the pull-up circuit. If the control signal B is not input to the second board 2, the signal path of the control signal B in the second board 2 is set to the H level by the pull-up circuit.

Next, a description will be given, with reference to FIGS.3 through 6, of the operation of the synchronization control apparatus according to the present invention in FIG.2.

Figure 3A:
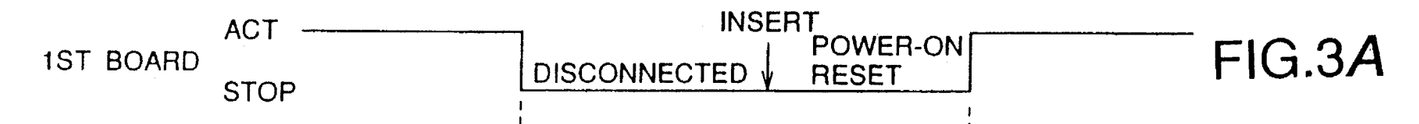
FIG.3 is a time chart for explaining the operation of the apparatus in FIG.2 when a first board is extracted from a system that is active, and it is inserted in the system.
Figures 3B, 3C:
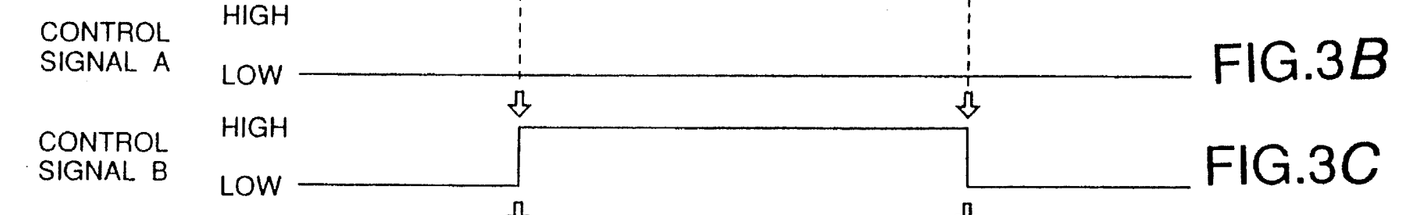
Figure 3D:
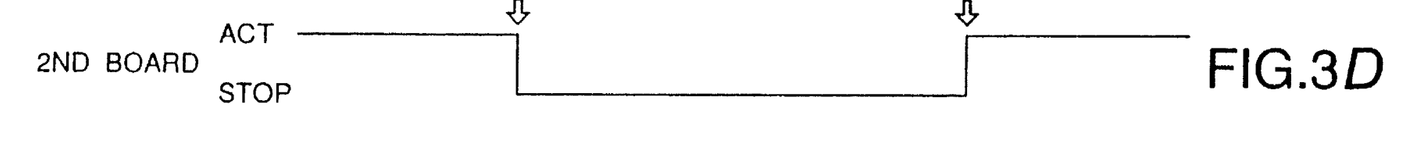

FIG.3 shows the operation of the apparatus in FIG.2 when the first board 1 is extracted from the system that is active, and when it is inserted in the system.

If the first board 1 is disconnected from the BWB 3, the switch 10 is turned OFF. The gate circuit 13 is immediately turned OFF as the switch 10 is turned OFF. As the gate circuit 13 is in its OFF state, the control signal B from the first board 1 is not output to the BWB 3 through the gate circuit 13. As the control signal B is not supplied from the first board 1 to the second board 2, the signal path of the control signal B in the second board 2 is set to the H level by the pull-up circuit. The stop and reset control part 21 at this time sets the internal circuits of the second board 2 to the stopped condition. Thus, the operation of the second board 2 is stopped in synchronism with the disconnection of the first board 1 from the BWB 3, and the operations of the two boards 1 and 2 are simultaneously stopped by the extraction of the first board 1.

If the first board 1 is connected to the BWB 3 again after it was disconnected therefrom, the switch 10 of the first board 1 is turned ON. As the gate circuit 13 is turned ON by an ON signal output from the switch 10, the power-on reset signal generating part 12 starts outputting a power-on reset signal to the gate circuit 13, so that the power-on reset action for the internal circuits of the first board 1 is performed. When a prescribed time has elapsed after the start of the power-on reset action by the part 12, the power-on reset action for the first board 1 is finished. The internal circuits of the first board 1 are made active by the power-on reset signal generating part 12. The power-on reset signal generating part 12 at this time outputs a low-level reset end signal PW to the gate circuit 13.

When the signal PW from the power-on reset signal generating part 12 is received by the gate circuit 13, the gate circuit 13 outputs the control signal B to the BWB 3. The control signal B from the first board 1 is supplied to the stop and reset control part 21 of the second board 2 through the BWB 3, and the signal path of the control signal B in the second board 2 is immediately changed from the H level to the L level. The internal circuits of the second board 2 are made active by the stop and reset control part 21 at this time. Thus, the operation of the second board 2 is started in synchronism with the connection of the first board 1 to the BWB 3, and the operations of the two boards 1 and 2 are simultaneously started or made active by the insertion of the first board 1.

Figures 4A, 4B:
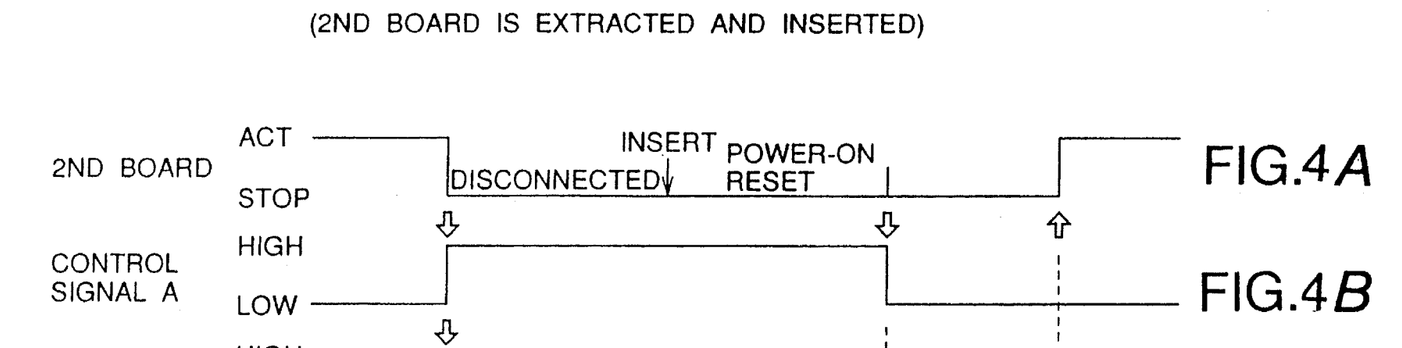
FIG.4 is a time chart for explaining the operation of the apparatus in FIG.2 when a second board is extracted from the system, and it is inserted in the system.
Figure 4C:
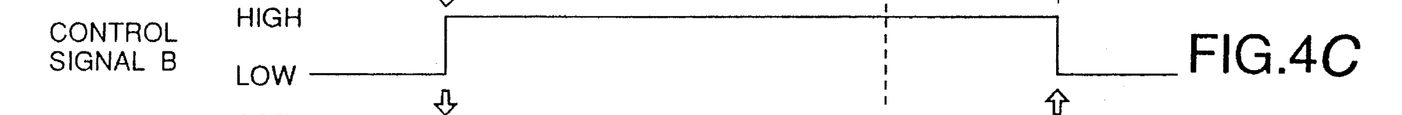
Figure 4D:
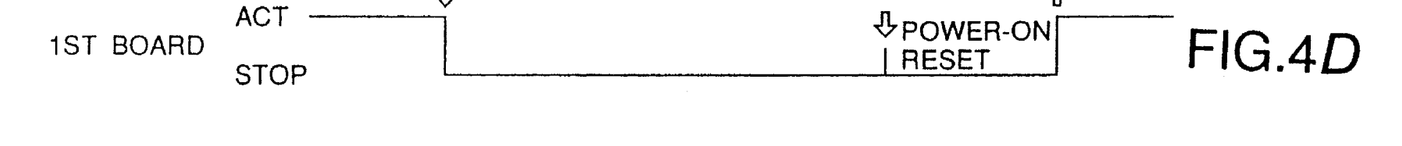

FIG.4 shows the operation of the apparatus in FIG.2 when the second board 2 is extracted from the system that is active, and when it is inserted in the system.

If the second board 2 is disconnected from the BWB 3, the switch. 20 is turned OFF. The power-on reset signal generating part 22 of the second board 2 stops outputting the control signal A to the BWB 3 at this time. As the control signal A from the second board 2 is not supplied to the first board 1 via the BWB 3, the signal path of the control signal A in the first board 1 is set to the H level by the pull-up circuit of the first board 1. The stop and reset control part 11 at this time sets the internal circuits of the first board 1 to the stopped condition. Thus, the operation of the first board 1 is stopped in synchronism with the disconnection of the second board 2 from the BWB 3, and the operations of the two boards 1 and 2 are simultaneously stopped by the extraction of the second board 2.

If the second board 2 is connected to the BWB 3 again after it was disconnected therefrom, the switch 20 of the second board 2 is turned ON. As the switch 20 is turned ON, the power-on reset signal generating part 22 starts outputting a power-on reset signal in response to ON signal output from the switch 20, so that the power-on reset action for the internal circuits of the second board 2 is performed. When a prescribed time has elapsed after the start of the power-on reset action by the part 22, the power-on reset action for the second board 2 is finished. The internal circuits of the second board 2 are thus made active by the power-on reset signal generating part 22. The power-on reset signal generating part 22 outputs a low-level control signal A to the BWB 3 when the power-on reset action for the second board 2 is finished.

The control signal A from the second board 2 is supplied to the stop and reset control part 11 of the first board 1 via the BWB 3, and the signal path of the control signal A in the first board 1 is changed to the L level. The stopped condition of the internal circuits of the first board 1 is reset by the stop and reset control part 11 at this time. At the same time, the power-on reset signal generating part 12 starts performing the power-on reset action for the internal circuits of the first board 1. When a prescribed time has elapsed after the start of the power-on reset action by the part 12, the power-on reset action for the first board 1 is finished. The internal circuits of the first board 1 are made active by the power-on reset signal generating part 12. The power-on reset signal generating part 12 at this time outputs a low-level reset end signal PW to the gate circuit 13.

When the signal PW from the power-on reset signal generating part 12 is received by the gate circuit 13, the gate circuit 13 outputs the control signal B to the BWB 3. The control signal B from the first board 1 is supplied to the stop and reset control part 21 of the second board 2 through the BWB 3, and the signal path of the control signal B in the second board 2 is immediately changed from the H level to the L level. The internal circuits of the second board 2 are made active by the stop and reset control part 21 at this time. Thus, the operation of the second board 2 is started in synchronism with the start of the operation of the first board 1 after the connection of the second board 2 to the BWB 3, and the operations of the two boards 1 and 2 are simultaneously started by the insertion of the second board 2.

Figure 5A:
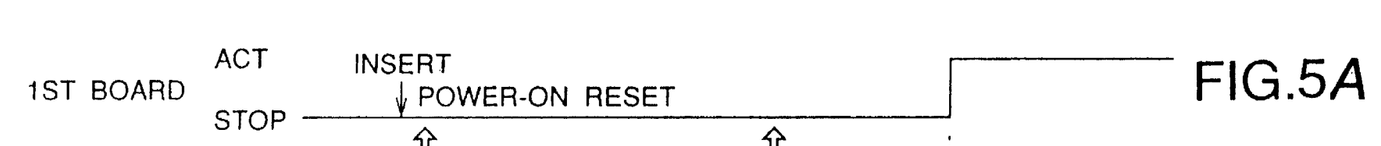
FIG.5 is a time chart for explaining the operation of the apparatus in FIG.2 when the first board and the second board are inserted in the system in that order.
Figures 5B, 5C, 5D:
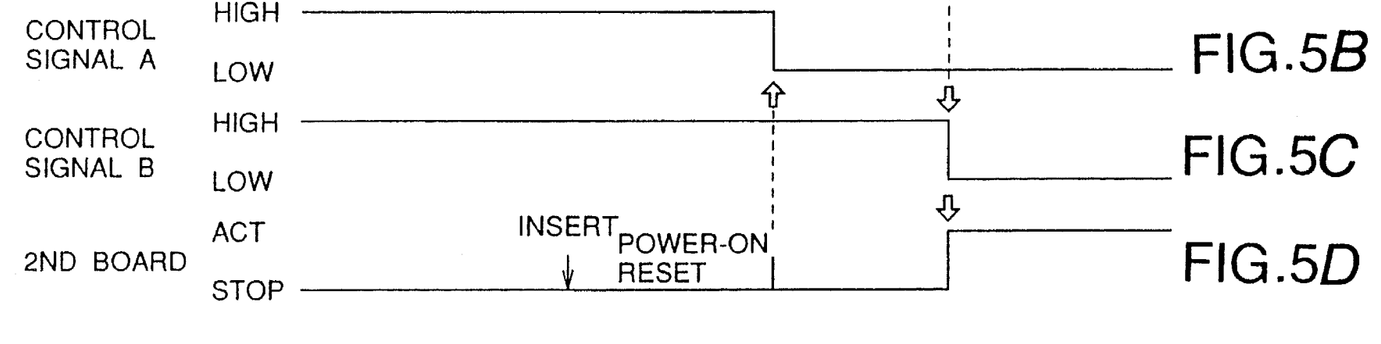

FIG.5 shows the operation of the apparatus in FIG.2 when the first board 1 and the second board 2 are inserted in the system in that order. When only the first board 1 is connected to the BWB 3 and the second board 2 is disconnected therefrom, the first board 1 does not receive the control signal A from the second board 2 via the BWB 3. The internal circuits of the first board 1 are not yet made active. The first board 1 at this time does not output a low-level control signal B to the second board 2 via the BWB 3. Thus, the operation of the first board 1 is not started solely by the insertion of only the first board 1 in the system.

The operation of the apparatus in FIG.5 when the second board 2 is inserted in the system after the connection of the first board 1 is the same as the operation of the above described example at the time of the insertion of the second board 2 in FIG.4. As described above in conjunction with FIG.4, the operations of the two boards 1 and 2 can be simultaneously started by the insertion of the second board 2.

Figures 6A, 6B:
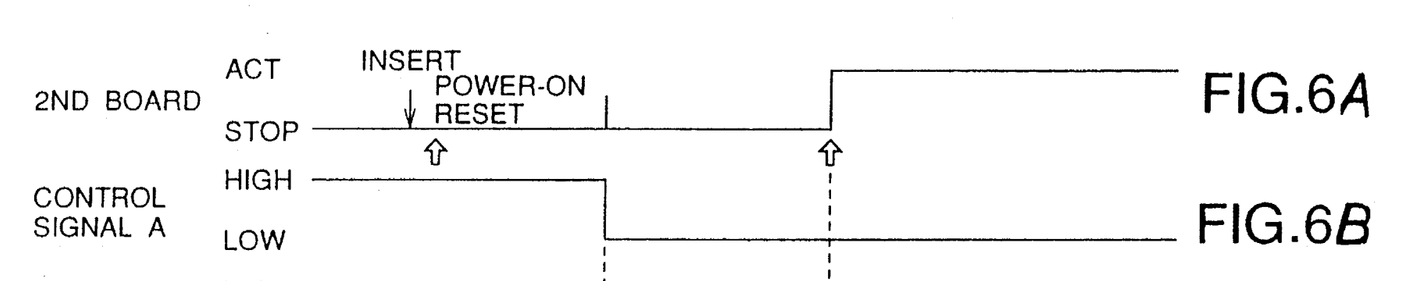
FIG.6 is a time chart for explaining the operation of the apparatus in FIG.2 when the second board and the first board are inserted in the system in that order.
Figures 6C, 6D:
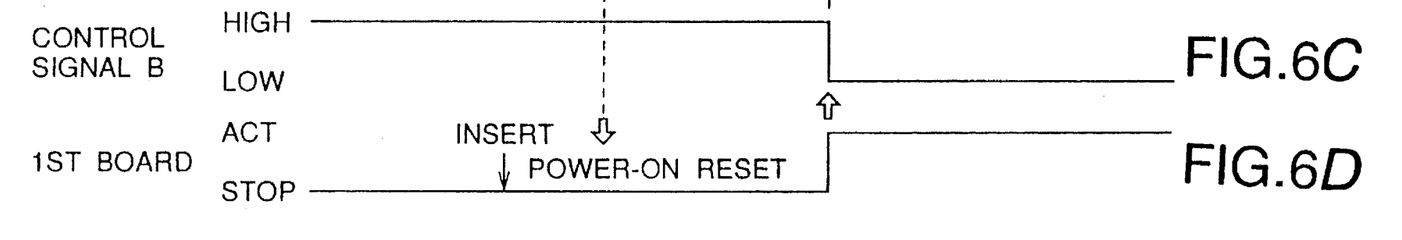

FIG.6 shows the operation of the apparatus in FIG.2 when the second board 2 and the first board 1 are inserted in the system in this order. When the second board 2 is connected to the BWB 3 with the first board 1 disconnected therefrom, the second board 2 does not receive the control signal B from the first board 1 via the BWB 3. The internal circuits of the second board 2 are not yet made active. The second board 2 at this time does not output a low-level control signal A to the first board 1 via the BWB 3. Thus, the operation of the second board 2 is not started solely by the insertion of the second board 2 in the system before the first board 1 is inserted therein.

The operation of the apparatus in FIG.6 when the first board 1 is inserted in the system after the second board 2 is connected to the BWB 3 is the same as the operation of the above described example at the time of the insertion of the first board 1 in the system in FIG.3. As described above in conjunction with FIG.3, the operations of the two boards 1 and 2 can be simultaneously started by the insertion of the first board 1.

Accordingly, the synchronization control apparatus and method of the present invention enables the system to start or stop the operations of the units in the combination in a synchronous manner with each other when one unit of the combination is disconnected from or connected to the system that is active.

As the synchronization control is realized with only the hardware of the system, it is not necessary to implement an improved software into a main processor of the system, and it is not necessary that the management or control of the disconnection or the connection of all of the units of the combination is carried out by means of the main processor. The task needed for the main processor in the system in which the synchronization control method of the present invention is implemented is to check whether each of the functions within the system is normally carried out, and the processing load of the main processor can be remarkably reduced.

Figure 7:
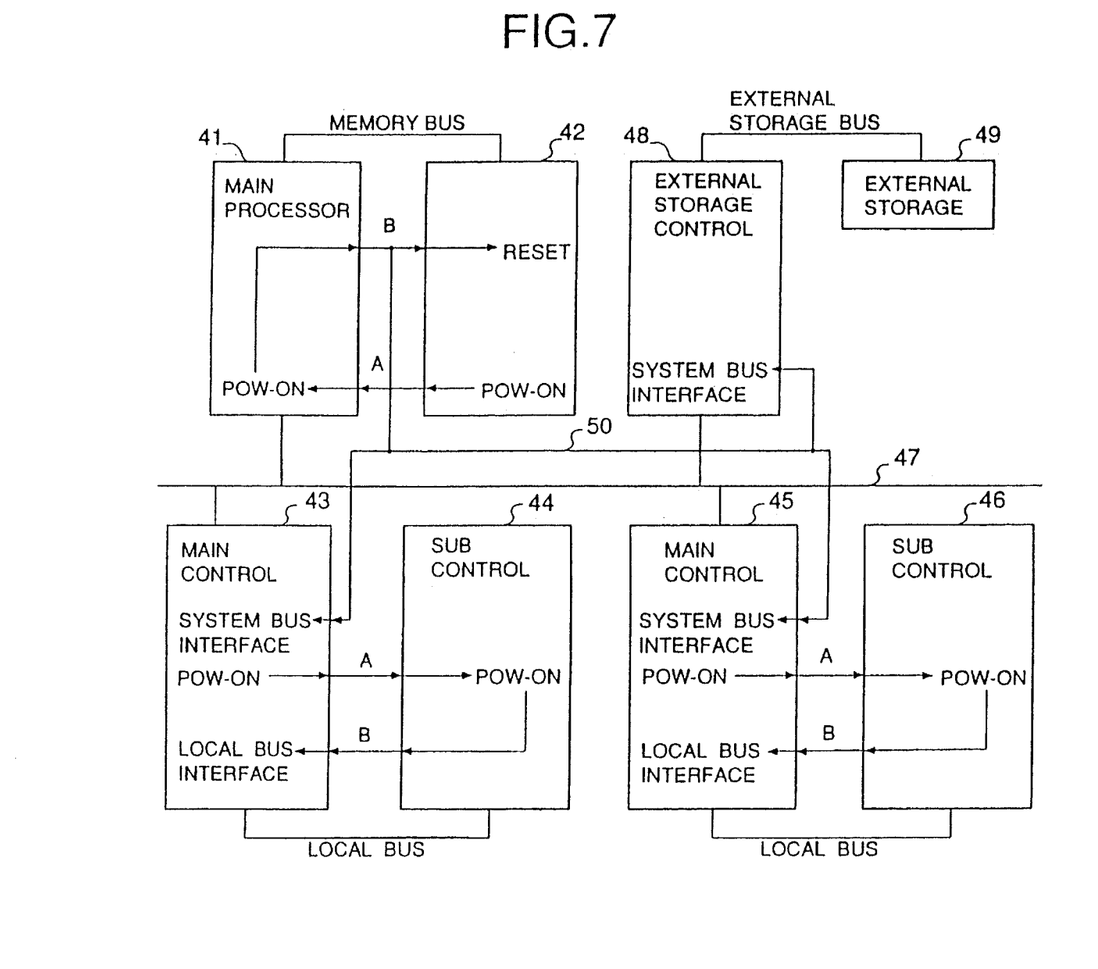
FIG.7 is a diagram showing a communication control system to which the present invention is applied.

FIG.7 shows a communication control system to which the present invention is applied. In FIG.7, this communication control system comprises a main processor unit 41, a main memory unit 42, a main control unit 43, a sub-control unit 44, a main control unit 45, and a sub-control unit 46. One of the functions of this communication control system is accomplished by the main processor unit 41 and the main memory unit 42 in combination, another function of the communication control system is accomplished by the main control unit 43 and the sub-control unit 44 in combination, and another function is accomplished by the main control unit 45 and the sub-control unit 46 in combination.

The communication control system in FIG.7 is connected to an external storage control unit 48 and an external storage unit 49. The main processor unit 41, the main control units 43 and 45, and the storage control unit 48 are interconnected via a system bus 47, and a signal from one"of these units is sent to or received by another unit via the system bus 47. A signal line 50 from the main processor unit 41 is connected to a system bus interface circuit of each of the main control units 43 and 45 and the storage control unit 48, and a reset signal from the main processor unit 41 is sent to the system bus interface circuit of each of these units via the signal line 50.

In the communication control system in FIG.7, the first board 1 in the above described embodiment of the present invention is mounted on each of the main processor unit 41, and the sub-control units 44 and 46. The second board 2 in the above described embodiment is mounted on each of the main memory unit 42 and the main control units 43 and 45. The control signals A and B described above are sent and received between the units 41 and 42, between the units 43 and 44, and between the units 45 and 46 through the BWB board 3.

Connectors of the units of the communication control system in FIG.7 have long pins and short pins arranged in a manner that is the same as that in the previously described conventional system. A complete connection or an incomplete connection at each of the connectors in the communication control system can be immediately detected at any time. The control signal A from one of the two units is sent to the other via the short pins of the connector between the two units, and the control signal B from the latter is sent back to the former via the short pins of the connector.

The operation of the thus constructed communication control system in several cases will be described. If, for example, the main processor unit 41 is disconnected from the system that is active, it is possible to immediately transmit a control system reset signal to the main memory unit 42 and immediately transmit a system bus interface stop signal to the system bus interface circuit of each of the units 43 and 45 when a power on/reset signal (the control signal A) from the main memory unit 42 is OFF, or a power on/reset signal (the control signal B) from the main processor unit 41 is OFF prior to the complete disconnection of the main processor unit 41.

On the other hand, if the main processor unit 41 is connected to the communication control system that is active, it is possible to start the operation of the main processor unit 41 in synchronism with each of the units of the system since the power on/reset signal from the main processor unit 41 to the main memory unit 42 is turned ON after the main processor unit 41 is completely connected to the system through the connector pin contact with the main memory unit 42.

If either the sub-control unit 44 or the sub-control unit 46 is disconnected from the system that is active, it is possible to immediately notify a local bus interface circuit in the main control unit 43 or 45 of the disconnection of the sub-control unit since a power on/reset signal from the main control unit 43 or 45 is OFF or a power on/reset signal from the sub-control unit 44 or 46 is OFF prior to the complete disconnection of the sub-control unit from the system.

On the other hand, if either the sub-control unit 44 or the sub-control unit 46 is connected to the system that is active, it is possible to start the operation of the sub-control unit in synchronism with each of the units of the system, by means of the local bus interface circuit of the main control unit, since the power on/reset signal from the sub-control unit to the main control unit is turned ON after the sub-control unit is completely connected to the system through the connector pin contact of the sub-control unit with the main control unit.

As described above, the synchronization control apparatus and method of the present invention enable the system to start or stop the operations of the units of the combination in a synchronous manner with each other when one of the units of the combination is connected to or disconnected from the system that is active. As the synchronization control is realized using only the hardware of the system, it is not necessary to implement improved software in a main processor of the system, and it is not necessary that the management or control of the disconnection or the connection of all of the units of the combination is carried out by means of the main processor. The task of the main processor in the system in which the synchronization control method of the present invention is implemented is to check whether each of the functions within the system is normally carried out, and the processing load of the main processor can be remarkably reduced.

Further, the present invention is not limited to the above described embodiment, and variations and modifications may be made without departing from the scope of the present invention.

What is claimed is:

1. An apparatus for controlling synchronization in a system having a plurality of units when one of the units is disconnected from or connected to the system that is active, wherein a prescribed function is carried out by a combination of the units including a first unit and a second unit, and both the units have a set of internal circuits to carry out the prescribed function and are removably installed on a unit installing part, said apparatus comprising:

signal path means, provided within the unit installing part, through which a control signal output from the second unit is sent to the first unit and a control signal output from the first unit is sent to the second unit;

first preparatory process means for carrying out a preparatory process to place the internal circuits of the second unit in an operating state when the second unit is connected to the system, and for outputting a control signal to the signal path means at the end of the preparatory process;

first function mask control means for stopping the operation of the internal circuits of the second unit when the control signal from the first unit is not received through the signal path means, and for re-starting the operation of the internal circuits of the second unit when the control signal from the first unit is received through the signal path means;

second preparatory process means for carrying out a preparatory process to place the internal circuits of the first unit in an operating state when the control signal from the second unit is received through the signal path means, and for outputting control signal to the signal path means at the end of the preparatory process; and second function mask control means for stopping the operation of the internal circuits of the first unit when the control signal from the second unit is not received through the signal path means, and for re-starting the operation of the internal circuits of the first unit when the control signal from the second unit is received through the signal path means.

2. An apparatus according to claim 1, wherein both said first preparatory process means and said second preparatory process means carry out a power-on reset process to start the operation of the internal circuits of the first unit or the second unit.

3. An apparatus according to claim 1, wherein both said first unit and said second unit include switch means for detecting whether the unit is connected to the system or disconnected from the system.

4. An apparatus according to claim 1, wherein both said first unit and said second unit include a connector in which long pins are arranged in the center of the connector and short pins are arranged at end portions of the connector, and the control signal from the second unit is sent to the first unit through the short pins of the connector, and the control signal from the first unit is sent to the second unit through the short pins of the connector.

5. An apparatus according to claim 2, wherein both said first unit and said second unit include a connector in which long pins are arranged in the center of the connector and short pins are arranged at end portions of the connector, and the control signal from the second unit is sent to the first unit through the short pins of the connector, and the control signal from the first unit is sent to the second unit through the short pins of the connector.

6. An apparatus according to claim 3, wherein both said first unit and said second unit include a connector in which long pins are arranged in the center of the connector and short pins are arranged at end portions of the connector, and the control signal from the second unit is sent to the first unit through the short pins of the connector, and the control signal from the first unit is sent to the second unit through the short pins of the connector.

7. An apparatus according to claim 1, wherein said first preparatory process means and said first function mask control means are provided within the second unit, and said second preparatory process means and said second function mask control means are provided within the first unit.

8. A method of controlling synchronization in a system having a plurality of units when one of the units is disconnected from or connected to the system that is active, wherein a prescribed function is carried out by a combination of the units including a first unit and a second unit, and both the units have a set of internal circuits to carry out the prescribed function and are removably installed on a unit installing part, said method comprising the steps of:

placing the internal circuits of the second unit in an operating state when the second unit is connected to the system;

outputting a control signal from the second unit to a signal path of the unit installing part at the end of said placing step for the second unit;

stopping the operation of the internal circuits of the second unit when a control signal output from the first unit is not received, and restarting the operation of the internal circuits of the second unit when the control signal from the first unit is received;

placing the internal circuits of the first unit in an operating state when a control signal output from the second unit is received;

outputting a control signal from the first unit to another signal path of the unit installing part at the end of said placing step for the first unit; and stopping the operation of the internal circuits of the first unit when the control signal from the second unit is not received, and re-starting the operation of the internal circuits of the first unit when the control signal from the second unit is received.

* * * * *